United States Patent
Ohkoshi et al.

(10) Patent No.: US 7,721,092 B2
(45) Date of Patent: May 18, 2010

(54) AUTHENTICATING DEVICE, AUTHENTICATED DEVICE AND KEY UPDATING METHOD

(75) Inventors: Takehiro Ohkoshi, Tokyo (JP); Keiki Yamada, Tokyo (JP); Satoru Makita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 286 days.

(21) Appl. No.: 10/584,193

(22) PCT Filed: Apr. 23, 2004

(86) PCT No.: PCT/JP2004/005879

§ 371 (c)(1),
(2), (4) Date: Feb. 23, 2007

(87) PCT Pub. No.: WO2005/067200

PCT Pub. Date: Jul. 21, 2005

(65) Prior Publication Data
US 2007/0150731 A1    Jun. 28, 2007

(30) Foreign Application Priority Data
Dec. 26, 2003    (JP) .............................. 2003-432447

(51) Int. Cl.
H04L 9/00    (2006.01)
H04L 9/08    (2006.01)
H04L 9/32    (2006.01)
H04L 29/06    (2006.01)

(52) U.S. Cl. ...................... 713/168; 713/156; 713/171; 380/30; 380/277; 380/283

(58) Field of Classification Search ...................... None
See application file for complete search history.

(56) References Cited

U.S. PATENT DOCUMENTS

| 5,081,677 | A | 1/1992 | Green et al. |
| 5,515,439 | A | 5/1996 | Bantz et al. |
| 5,519,706 | A | 5/1996 | Bantz et al. |
| 6,895,507 | B1 * | 5/2005 | Teppler ........................ 726/19 |
| 2002/0071563 | A1 | 6/2002 | Kurn et al. |
| 2002/0197979 | A1 | 12/2002 | Vanderveen |
| 2004/0034771 | A1 * | 2/2004 | Edgett et al. ................. 713/168 |
| 2005/0120203 | A1 * | 6/2005 | Yeh et al. ..................... 713/156 |

FOREIGN PATENT DOCUMENTS

| EP | 0 656 708 A1 | 6/1995 |
| EP | 0 998 073 A2 | 5/2000 |

(Continued)

*Primary Examiner*—Kaveh Abrishamkar
(74) *Attorney, Agent, or Firm*—Birch, Stewart, Kolasch & Birch, LLP (57) ABSTRACT

An authenticating device 100 includes an authentication processing unit 197 to perform an authentication process with a communication device 200 using an authentication key, an update key generating unit 160 to generate a new authentication key when the communication device 200 does not hold an authentication key to be used in the authentication process by the authentication processing unit 197, and to generate a new authentication key for updating the authentication key when the communication device 200 holds the authentication key but the authentication process with the communication device 200 by the authentication processing unit 197 fails. The authentication processing unit 197 performs again the authentication process with the communication device 200 using the new authentication key generated by the update key generating unit 160.

6 Claims, 6 Drawing Sheets

FOREIGN PATENT DOCUMENTS

| | | |
|---|---|---|
| JP | 11-85014 A | 3/1999 |
| JP | 11-274999 A | 10/1999 |
| JP | 2000-138674 A | 5/2000 |
| JP | 2000-196588 A | 7/2000 |
| JP | 2001-357370 A | 12/2001 |
| JP | 2003-196240 A | 7/2003 |
| WO | WO-00/19652 A1 | 4/2000 |
| WO | WO-02/096151 A1 | 11/2002 |

\* cited by examiner

COMMUNICATION INFORMATION 1

| HEADER |
|---|
| RANDOM NUMBER 1 |

Fig. 5

COMMUNICATION INFORMATION 2

| HEADER | | |
|---|---|---|
| RANDOM NUMBER 2 | | |
| DEVICE UNIQUE NO. | | |
| NO. OF PROFILES | | |
| PROFILE 1 | ALGORITHM ID | KEY ID |
| . | . | . |
| . | . | . |
| . | . | . |
| PROFILE N | ALGORITHM ID | KEY ID (UPDATING IDENTIFIER) |

Fig. 6

COMMUNICATION INFORMATION 3

| HEADER | | |
|---|---|---|
| PROFILE N | ALGORITHM ID | KEY ID (UPDATING IDENTIFIER) |
| UPDATING DATA | | |

AUTHENTICATING DEVICE, AUTHENTICATED DEVICE AND KEY UPDATING METHOD

TECHNICAL FIELD

The present invention relates to an authenticating device, an authenticated device or a key updating method for both the devices. The present invention, in particular, relates to a mobile having a wireless communication function and a mobile communication system, such as ETC (Electronic Toll Collection) or drive-through.

BACKGROUND ART

When a user enjoys a certain service, identification (authentication) is performed to identify whether the user is a valid user qualified to enjoy the service. In such case, the user cannot enjoy the service if the user fails in the authentication for such a reason as lack of a key or expiration of a key.

There has been a problem in that even a valid user (even when the user has no intention to commit a fraud) becomes unable to receive the service, if the user neglects procedures to validate the user, such as to update a key.

Further, there has been another problem in the art described in JP2003-196240 that an authentication is temporarily permitted, therefore, if a user has succeeded in an authentication in the past, the user can be repeatedly authenticated thereafter, and may be able to access the authenticating device, which could result in a security hole.

Further, there has been another problem in the arts described in JP11-274999, JP2000-138674, and JP2000-196588 that a used key is determined only among the keys held by the both parties, and execution of a key update is impossible.

It is an object of the present invention to provide a service to an authorized user and to enhance service availability and convenience for a user by means of a key updated by executing a key update.

DISCLOSURE OF THE INVENTION

There is provided according to one aspect of the present invention an authenticating device including: an authentication processing unit to perform an authentication process with an authenticated device using an authentication key; and an update key generating unit to generate a new authentication key when the authenticated device does not hold an authentication key to be used in the authentication process by the authentication processing unit, and to generate a new authentication key for updating an authentication key to be used in the authentication process by the authentication processing unit when the authenticated device holds the authentication key but the authentication process with the authenticated device by the authentication processing unit fails.

The authentication processing unit performs the authentication process with the authenticated device again, using the new authentication key generated by the update key generating unit.

Additionally, the authenticating device further includes a receiving unit to receive a prescribed algorithm identifier and a prescribed encryption key identifier from the authenticated device, wherein the update key generating unit generates the new authentication key based on the prescribed algorithm identifier and the prescribed encryption key identifier received by the receiving unit.

The authenticating device, further includes a transmitting unit to transmit the new authentication key generated by the update key generating unit to the authenticated device, wherein the authentication processing unit performs the authentication process with the authenticated device again, using the new authentication key transmitted by the transmitting unit.

There is provided according to another aspect of the present invention an authenticated device including: a memory unit to store a prescribed algorithm identifier and a prescribed encryption key identifier; an authentication processing unit to perform an authentication process with an authenticated device using an authentication key; a transmitting unit to transmit the prescribed algorithm identifier and the prescribed encryption key identifier stored by the memory unit, to the authenticating device when the authentication process with the authenticating device by the authentication processing unit fails; and a receiving unit to receive from the authenticating device a new authentication key based on the prescribed algorithm identifier and the prescribed encryption key identifier transmitted by the transmitting unit.

The authentication processing unit performs the authentication process with the authenticating device again, using the new authentication key received by the receiving unit.

Further, the receiving unit receives prescribed information from the authenticating device when the authentication process with the authenticating device by the authentication processing unit fails, and the transmitting unit transmits the prescribed algorithm identifier and the prescribed encryption key identifier stored by the memory unit, when the prescribed information has been received by the receiving unit.

There is provided according to another aspect of the present invention a key updating method including: a first transmitting step to transmit prescribed information from an authenticating device to an authenticated device when an authentication process fails, the authentication process being performed between the authenticated device which stores a prescribed algorithm identifier and a prescribed encryption key identifier, and the authenticating device, using an authentication key; a first receiving step to receive the prescribed information transmitted from the authenticating device by the first transmitting step, at the authenticated device; a second transmitting step to transmit, from the authenticated device to the authenticating device, the prescribed algorithm identifier and the prescribed encryption key identifier stored, after the prescribed information is received by the first receiving step; a second receiving step to receive the prescribed algorithm identifier and the prescribed encryption key identifier transmitted by the second transmitting step, at the authenticating device; a generating step to generate a new authentication key based on the prescribed algorithm identifier and the prescribed encryption key identifier received by the second receiving step, at the authenticating device; a third transmitting step to transmit the new authentication key generated by the generating step to the authenticated device; a third receiving step to receive the new authentication key transmitted by the third transmitting step, at the authenticated device; a key updating step to execute a key update using the new authentication key received by the third receiving step, as an update key to perform the authentication process between the authenticated device and the authenticating device; a step to generate and transmit an update confirmation data to the authenticating device; and a step to receive and check the update confirmation data.

PREFERRED EMBODIMENTS FOR CARRYING OUT THE INVENTION

Embodiment 1

It is hereinafter explained that even when an authenticated device does not hold a key or holds an expired key at the time an authentication is performed between the authenticated device and an authenticating device, the authentication does not result in a failure, but a key update is executed by a key updating means and then the authentication is performed.

Figure 1:
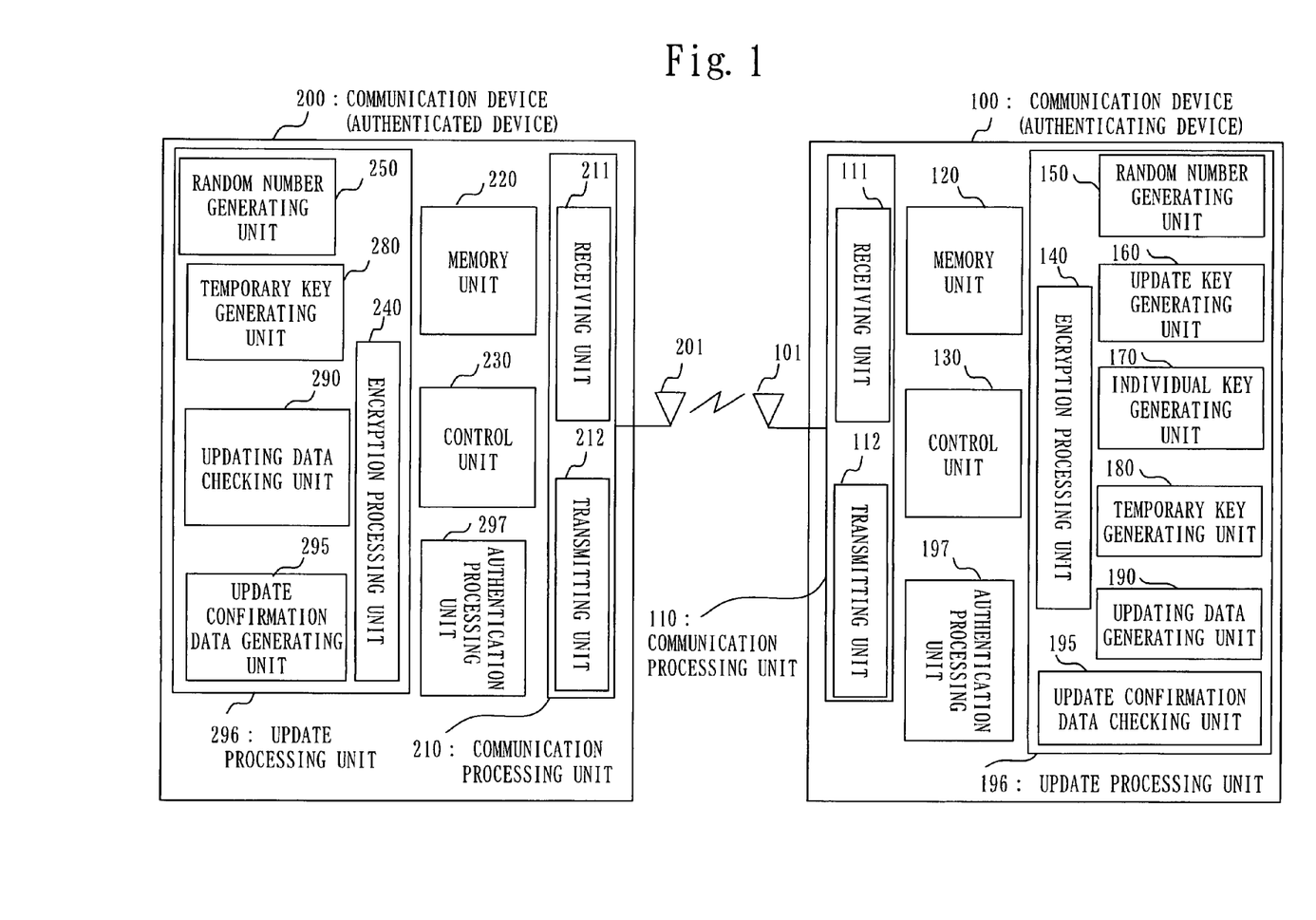
FIG. 1 is a diagram describing a structure of an authentication system according to a first embodiment.

FIG. 1 is a diagram describing a structure of an authentication system according to the first embodiment.

In FIG. 1, the authentication system includes a communication device 100 as an authenticating device and a communication device 200 as an authenticated device. The communication device 100 includes an antenna 101, a communication processing unit 110, a memory unit 120, a control unit 130, an update processing unit 196 and an authentication processing unit 197. The communication processing unit 110 includes a receiving unit 111 and a transmitting unit 112. The update processing unit 196 includes an encryption processing unit 140, a random number generating unit 150, an update key generating unit 160, an individual key generating unit 170, a temporary key generating unit 180, an updating data generating unit 190 and an update confirmation data checking unit 195. The communication device 200 includes an antenna 201, a communication processing unit 210, a memory unit 220, a control unit 230, an update processing unit 296 and an authentication processing unit 297. The communication processing unit 210 includes a receiving unit 211 and a transmitting unit 212. The update processing unit 296 includes an encryption processing unit 240, a random number generating unit 250, a temporary key generating unit 280, an updating data checking unit 290 and an update confirmation data generating unit 295. The first embodiment describes a case wherein wireless communication is performed between the communication device 100 and the communication device 200 via the antennas 101 and 201. However, it is not restricted to wireless communication, and wire communication can be performed instead. For example, it is possible to configure the communication device 100 as a roadside device at a store side, and the communication device 200 as an on-board device at a vehicle side in ETC (Electronic Toll Collection), drive-through, etc.

Figure 2:
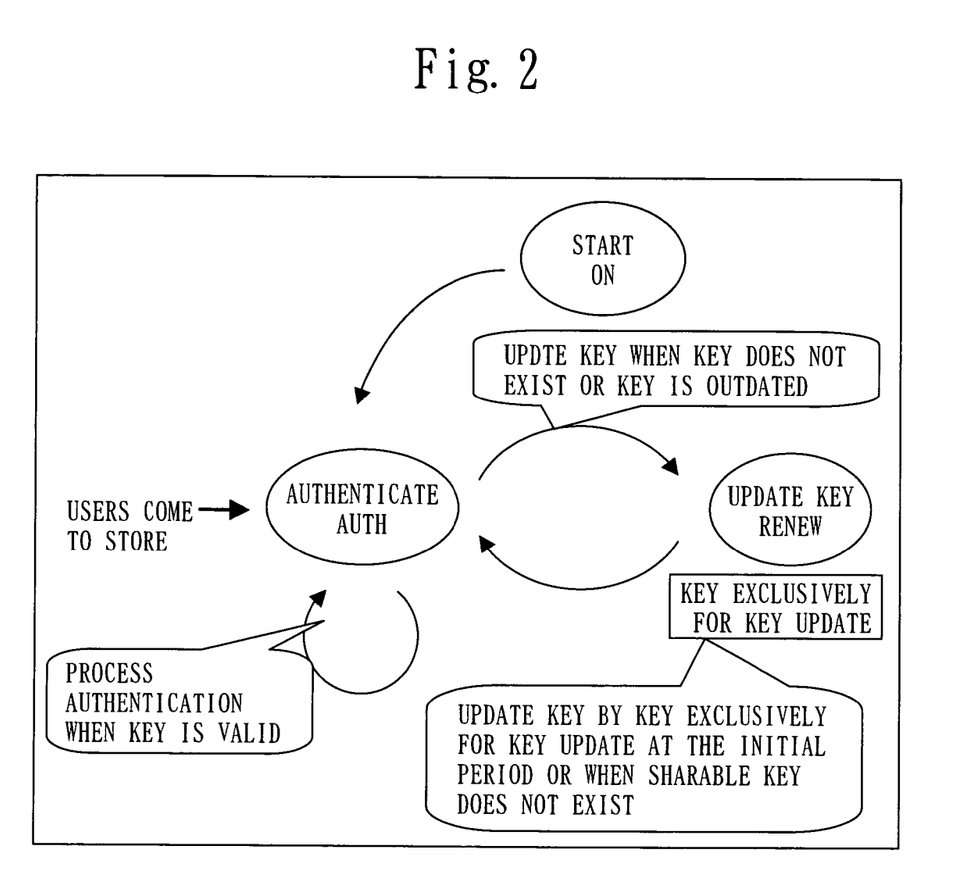
FIG. 2 is a diagram describing a concept of the authentication system according to the first embodiment.

FIG. 2 is a diagram describing a concept of the authentication system according to the first embodiment. For example, when the communication device 100 is configured as a roadside device at a store side, and the communication device 200 is configured as an on-board device at a vehicle side in ETC, drive-through etc., the roadside device at the store side, after having been started, continues waiting for a user (a vehicle) to come to (go through) the store in a state ready to perform an authentication process for providing services according to ETC, drive-through etc.

When the user comes to the store, the roadside device transmits an authentication request to the on-board device installed in the vehicle.

The on-board device transmits necessary information to the roadside device in accordance with a instruction by the roadside device.

If the roadside device determines that the information received from the on-board device is outdated or in lack of a key, the roadside device goes into a state of a key update and requests a key update to the on-board device.

The on-board device executes a key update in accordance with the instruction by the roadside device.

After the key update is completed, the roadside device goes into a state of an authentication, and performs the authentication process against the on-board device.

Stated differently, the authentication system or the authentication method according to the first embodiment includes a key updating means. The authentication process and the update process are separate processes. The update process is not executed while the authentication process is performed.

Then, the authentication process is performed after execution of the key update when key information is outdated or does not exist. That is to say, at the initial period (when in lack of key information), a key update process is executed. Meanwhile, during the period of normal operation, the authentication process is performed and in such a case that the key information used for the authentication is outdated, the key update process is executed.

Figure 3:
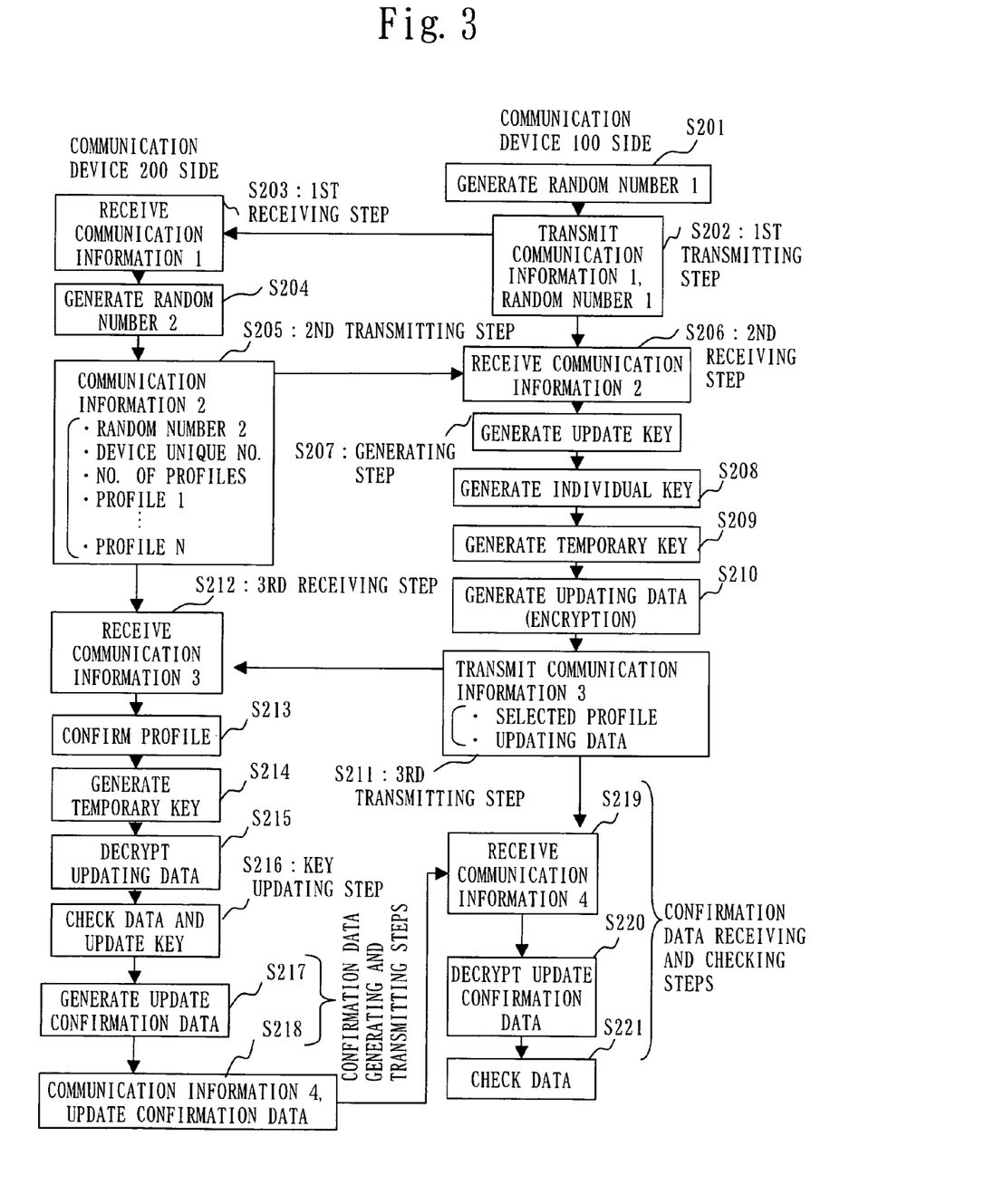
FIG. 3 is a flowchart describing a procedure of a key updating method according to the first embodiment.

FIG. 3 is a flowchart describing a procedure of a key updating method according to the first embodiment.

The memory unit 120 stores a prescribed algorithm identifier, a prescribed encryption key identifier, and an algorithm corresponding to the prescribed algorithm identifier.

The memory unit 220 stores a prescribed algorithm identifier, a prescribed encryption key identifier, an algorithm corresponding to the prescribed algorithm identifier, an encryption key corresponding to the prescribed encryption key identifier and a device unique number. Further, the memory unit 220 may store an authentication key being outdated or having expired and an identifier of the authentication key. Alternatively, the memory unit 220 may be configured so as not to store the authentication key. The prescribed encryption key identifier is an identifier of a key exclusively for key update (updating identifier). The encryption key corresponding to the prescribed encryption key identifier is the key exclusively for key update. The identifier of the key exclusively for key update and the key exclusively for key update are used in either case of the key update process accompanying generation of a new key at the initial period (before shipment of the device, for example), or of the key update process accompanying generation of another new key in emergency settings, when an authentication key sharable by both the communication devices 100 and 200 does not exist in the key update process occurred in the period of normal operation. The identifier of the key exclusively for key update and the key exclusively for key update are not used in the authentication process.

First, the authentication processing unit 197 performs the authentication process with the communication device 200 as the authenticated device. The authentication processing unit 297 in turn performs the authentication process with the communication device 100 as the authenticating device. The authentication process is performed by using the authentication key. When the memory unit 220 stores the authentication key being outdated or having expired, or when the memory unit 220 does not store the authentication key, the authentication process fails at this point, since the authentication key is unavailable.

When the authentication process fails, the random number generating unit 150 generates random number 1 in S201 (Step 201) as a random number generating step.

In S202 as a transmitting step, the transmitting unit 112 transmits the random number 1 (one example of prescribed information) generated by the random number generating unit 150 as communication information 1 to the communication device 200. By transmitting the random number 1 as the communication information 1 to the communication device 200, the communication device 100 informs the communication device 200 of transition from the authentication process to the key update process.

In S203 as a receiving step, the receiving unit 211 receives the random number 1 as the communication information 1 transmitted by the transmitting unit 112. By receiving the random number 1 by the receiving unit 211, the communication device 200 determines that the key update is requested by the communication device 100.

In S204 as part of an authentication processing step, the random number generating unit 250 generates a random number 2.

In S205 as a transmitting step, the transmitting unit 212 transmits as communication information 2, the prescribed algorithm identifier, the prescribed encryption key identifier, the device unique number stored by the memory unit 220, and the random number 2 generated by the random number generating unit 250, to the communication device 200 as the authenticating device. The transmitting unit 212 transmits an identifier of the authentication key being outdated or having expired, together with an algorithm identifier corresponding to the identifier of the authentication key, if they exist. One algorithm identifier and one encryption key identifier are paired as a set represented as a profile, and the communication information 2 contains as data the random number 2, the device unique number, number of the profiles which is the same number as the sets, profile identifiers of the same number as the number of the profiles, and the algorithm identifiers and the encryption key identifiers paired as the profiles identified by each of the profile identifiers. Further, each of the profile identifiers, the algorithm identifier and the encryption key identifier paired as the profile identified by each of the profile identifiers are such data that the identifiers are mutually correspondent. In sum, the transmitting unit 212 transmits to the communication device 100 as the authenticating device, at least one algorithm identifier and at least one encryption key identifier stored by the memory unit 220 in such a manner that one algorithm identifier and one encryption key identifier are paired as one profile.

In S206 as a receiving step, the receiving unit 111 receives, from the communication device 200 as the authenticated device, the communication information 2 containing the random number 2, the device unique number, the number of the profiles which is the same number as the sets, at least one profile identifier of the same number as the number of the profiles, and at least one algorithm identifier and at least one encryption key identifier corresponding to each of at least one profile identifier.

In S207 as a generating step, the update key generating unit 160 selects the prescribed encryption key identifier as the identifier of the key exclusively for key update, and the prescribed algorithm identifier corresponding to the prescribed encryption key identifier among at least one algorithm identifier and at least one encryption key identifier received by the receiving unit 111. Then, the update key generating unit 160 generates a new authentication key as an update key by using the device unique number etc. received by the receiving unit 111, and a hash value and the like. In other words, the update key generating unit 160, based on the prescribed algorithm identifier and the prescribed encryption key identifier received by the receiving unit 111, generates the new authentication key when the communication device 200 as the authenticated device does not hold an authentication key to be used in the authentication process by the authentication processing unit 197, and the update key generating unit 160 generates the new authentication key for updating the authentication key when the communication device 200 as the authenticated device holds the authentication key to be used in the authentication process by the authentication processing unit 197 but the authentication process with the communication device 200 as the authenticated device by the authentication processing unit 197 fails.

In S208 as an individual key generating step, the individual key generating unit 170 generates, in a way similar to the update key generating unit 160, an individual key as the key exclusively for key update held by the communication device 200, which is the encryption key corresponding to the prescribed encryption key identifier selected by the update key generating unit 160.

In S209 as a temporary key generating step, the temporary key generating unit 180, by using an algorithm corresponding to the prescribed algorithm identifier selected by the update key generating unit 160, encrypts the random numbers 1 and 2 with the individual key generated by the individual key generating unit 170 as the encryption key corresponding to the prescribed encryption key identifier, by using the encryption processing unit 140, and generates a temporary key as one example of an encryption key for key update process.

In S210 as an updating data generating step, the updating data generating unit 190 generates updating data by encrypting the whole or part of the random number 2 and the new authentication key as the update key with the temporary key generated by the temporary key generating unit 180, by the encryption processing unit 140.

In S211 as a transmitting step, the transmitting unit 112 transmits, as communication information 3, the prescribed algorithm identifier, the prescribed encryption key identifier and the prescribed profile identifier selected by the update key generating unit 160, and the updating data generated by the updating data generating unit 190, to the communication device 200 as the authenticated device.

In S212 as a receiving step, the receiving unit 211 receives, as the communication information 3, the prescribed algorithm identifier, the prescribed encryption key identifier, the profile identifier corresponding to the prescribed algorithm identifier and the prescribed encryption key identifier, and the updating data, transmitted from the communication device 100 as the authenticating device by the transmitting unit 212. In other words, the receiving unit 211 receives the new authentication key based on the prescribed algorithm identifier and the prescribed encryption key identifier transmitted by the transmitting unit 212 from the communication device 100 as the authenticating device.

In S213 as a confirming step, the encryption processing unit 240 confirms the profile identifier received by the receiving unit 211, and the prescribed encryption key identifier and the prescribed algorithm identifier corresponding to the profile identifier.

In S214 as a temporary key generating step, the temporary key generating unit 280, by using the algorithm corresponding to the prescribed algorithm identifier received by the receiving unit 211 and confirmed by the encryption processing unit 240, encrypts the random numbers 1 and 2 with the individual key stored by the memory unit 220 by using the encryption processing unit 240, and generates the temporary key as one example of an encryption key for update process. In this way, the communication devices 100 and 200 are able to share the same temporary keys. When the temporary keys are generated, encryption is performed with the temporary key by the temporary key generating units 180 and 280 in the present embodiment. Instead, decryption may be performed, since it is only necessary that the authenticating device and the authenticated device perform the same process.

In S215 as an updating data checking step, the updating data checking unit 290 decrypts the encrypted updating data received as the communication information 3 by the receiving unit 211 with the temporary key generated by the temporary key generating unit 280, by using the encryption processing unit 240.

In S216, as part of a key updating step, the updating data checking unit 290 checks whether the decrypted updating data is the whole or part of the random number 2 transmitted from the communication device 200 to the communication device 100. If the decrypted updating data is the whole or part of the random number 2, it is shown that the communication for the authentication process is performed properly with the communication device 100, not with a fraudulent attacker. That is to say, one way of the authentication process between the communication devices 100 and 200 is proved to be successful. Then, the updating data checking unit 290 executes a key update by using the new authentication key generated with decryption, which is received by the receiving unit 211, as an update key to perform the authentication process between the communication device 100 and the communication device 200. The update key is stored by the memory unit 220.

In S217 as an update confirmation data generating step, the update confirmation data generating unit 295 generates an update confirmation data by encrypting the whole or part of the random number 1 with the temporary key generated by the temporary key generating unit 280, by the encryption processing unit 240.

In S218 as a transmitting step, the transmitting unit 212 transmits the update confirmation data generated by the update confirmation data generating unit 295 as communication information 4 to the communication device 100.

In S219 as a receiving step, the receiving unit 111 receives the update confirmation data as the communication information 4 from the communication device 200.

In S220 as an update confirmation data checking step, the update confirmation data checking unit 195 decrypts the encrypted update confirmation data received by the receiving unit 111 as the communication information 4, with the temporary key generated by the temporary key generating unit 180, by the encryption processing unit 140.

In S221 as an update confirmation data checking step, the update confirmation data checking unit 195 checks whether the decrypted data of the update confirmation data is the whole or part of the random number 1 transmitted from the communication device 100 to the communication device 200. When the decrypted data of the update confirmation data is the whole or part of the random number 1, it is shown that the communication for the authentication process is performed properly with the communication device 200, not with a fraudulent attacker. That is to say, the other way of the authentication process between the communication device 100 and the communication device 200 is proved to be successful.

As stated above, the key update process between the communication device 100 and the communication device 200 is completed, and thereafter the authentication processing unit 197 performs again the authentication process with the communication device 200 as the authenticated device by using the new authentication key generated by the update key generating unit 160. The authentication processing unit 297 in turn performs again the authentication process with the communication device 100 as the authenticating device by using the new authentication key received by the receiving unit 211.

Figure 4:
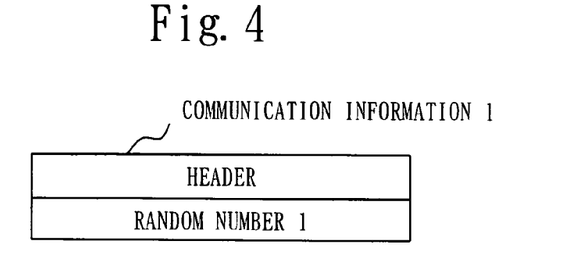
FIG. 4 is a diagram describing an example of a frame of communication information 1.

FIG. 4 is a diagram describing an example of a frame of the communication information 1.

In FIG. 4, the communication information 1 contains a header and data of the random number 1.

Figure 5:
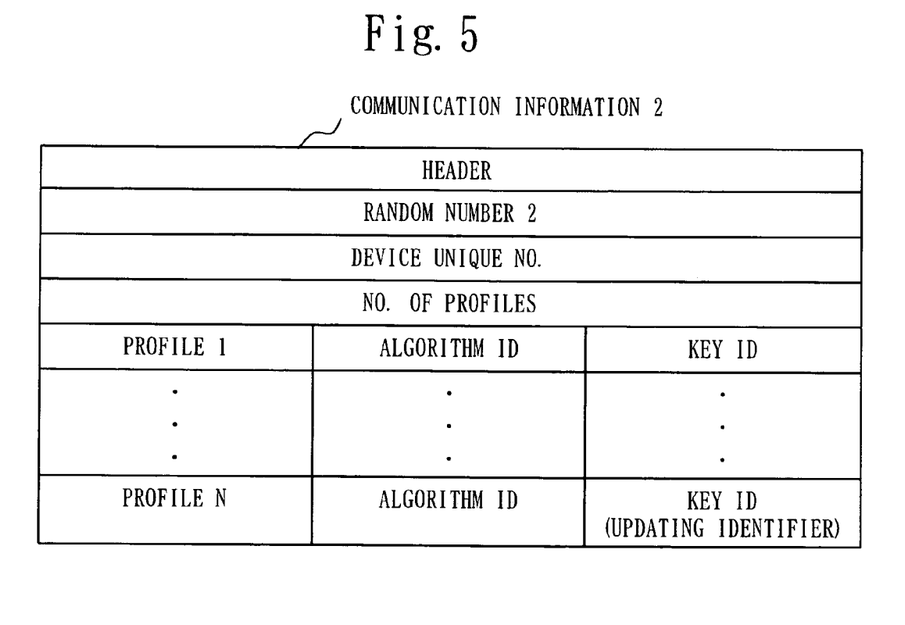
FIG. 5 is a diagram describing an example of a frame of communication information 2.

FIG. 5 is a diagram describing an example of a frame of the communication information 2.

In FIG. 5, the communication information 2 contains a header, data of the random number 2, the device unique number (device unique No.), the number of profiles (No. of profiles), Profile 1, . . . Profile n as the profile identifiers to identify each of the profiles, and the algorithm identifiers (algorithm IDs) and the encryption key identifiers (key IDs) corresponding to each of the profile identifiers. The identifier of the key exclusively for key update (updating identifier) and the algorithm identifier corresponding to the updating identifier are indicated in the profile of the last number. In FIG. 5, the data is organized in such a manner that the correspondent relation among each of the profile identifiers, and the algorithm identifiers and the encryption key identifiers corresponding to each of the profile identifiers is recognizable.

Figure 6:
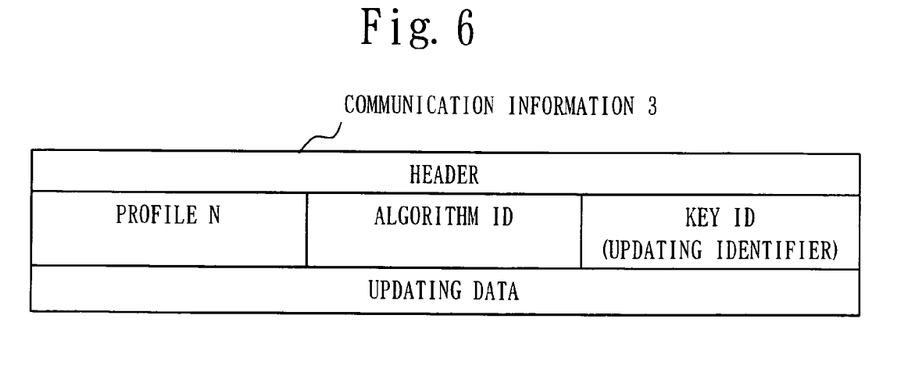
FIG. 6 is a diagram describing an example of a frame of communication information 3.

FIG. 6 is a diagram describing an example of a frame of the communication information 3.

In FIG. 6, the communication information 3 contains a header, Profile n as the prescribed profile identifier to identify the prescribed profile selected, the algorithm identifier (algorithm ID) and the encryption key identifier (key ID) corresponding to the prescribed profile identifier, and the updating data. In FIG. 5, the data is organized in such a manner that the correspondent relation among the prescribed profile identifier, the algorithm identifier and the encryption key identifier corresponding to the prescribed profile identifier is recognizable.

Figure 7:
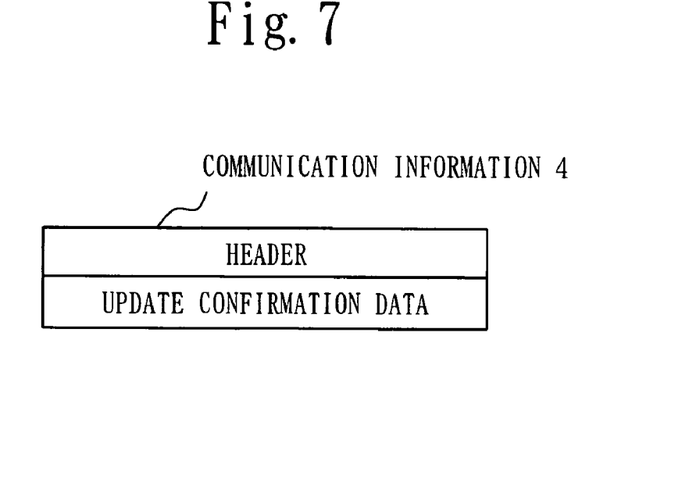
FIG. 7 is a diagram describing an example of a frame of communication information 4.

FIG. 7 is a diagram describing an example of a frame of the communication information 4.

In FIG. 7, the communication information 4 contains a header and the update confirmation data.

The control unit 130 controls each of the units in the communication device 100. The control unit 230 in turn controls each of the units in the communication device 200. Further, the memory unit 120 stores data generated in processes performed at each of the units in the communication device 100. The memory unit 220 in turn stores data generated in processes performed at each of the units in the communication device 200.

As stated above, the key updating method according to the first embodiment includes: the first transmitting step to transmit the prescribed information from the authenticating device to the authenticated device when the authentication process fails, the authentication process being performed between the authenticated device which stores the prescribed algorithm identifier and the prescribed encryption key identifier, and the authenticating device, using the authentication key; the first receiving step to receive the prescribed information transmitted from the authenticating device by the first transmitting step, at the authenticated device; the second transmitting step to transmit, from the authenticated device to the authenticating device, the prescribed algorithm identifier and the prescribed encryption key identifier stored, after the prescribed information is received by the first receiving step; the second receiving step to receive the prescribed algorithm identifier and the prescribed encryption key identifier transmitted by the second transmitting step, at the authenticating device; the generating step to generate the new authentication key based on the prescribed algorithm identifier and the prescribed encryption key identifier received by the second receiving step, at the authenticating device; the third transmitting step to transmit the new authentication key generated by the generating step to the authenticated device; the third receiving step to receive the new authentication key transmitted by the third transmitting step, at the authenticated device; the key updating step to execute the key update using the new authentication key received by the third receiving step, as the update key to perform the authentication process between the authenticated device and the authenticating device; the step to generate and transmit the update confirmation data to the authenticating device; and the step to receive and check the update confirmation data.

Further, when the communication device 100 is configured as the roadside device at a store side, and the communication device 200 is configured as the on-board device at a vehicle side in ETC, drive-through etc., for example, the on-board device implementing the authentication method as mentioned above, switches to the state of the key update (executes the key update) in accordance with an instruction by the roadside device. In this case, the on-board device does not switch to the state of the key update nor request the key update by its own decision. Additionally, the roadside device implementing the authentication method requests the key information to the on-board device, checks the key-information, and if necessary, instructs the key update to the on-board device. That is to say, the process is performed at the initiative of the roadside device.

It is herein assumed one example of the application of the authentication method to the vehicle (on-board device) and the roadside device (store system) in ETC and drive-through etc. However, communication devices are not restricted to such communication devices. For example, the authentication method can be applicable to communication between a fixed station and a mobile station, such as a base station and a mobile telephone, wireless LAN (a base station and a personal computer), R/W (Reader/Writer) or RF Tag (electronic tag), as well as mobile-to-mobile communication and the like.

As stated above, the embodiment makes it possible to execute the key update even in such a case of lack of a key or expiration of a key, to provide a service to an authorized user thereafter, and to enhance the service availability and the user usability of the system using the present invention.

Further, the embodiment eliminates a necessity of setup operation. Specifically, it is no more necessary to set up unique information of on-board devices, such as a key to be used in cipher communication, before shipment of the on-board devices and when the on-board devices are installed in vehicles at stores, for example. Therefore, it is possible to produce the same on-board devices in production, and to increase productivity. The unique information of on-board devices is important to maintain the security of the system, therefore, detailed restrictions such as the restriction of registrants and operators who can obtain the unique information at the time of setting up the on-board devices are imposed. However, since the setup operation is not necessary any more, any traders can install the on-board devices, and the distribution cost and the workload are reduced.

Embodiment 2

Figure 8:
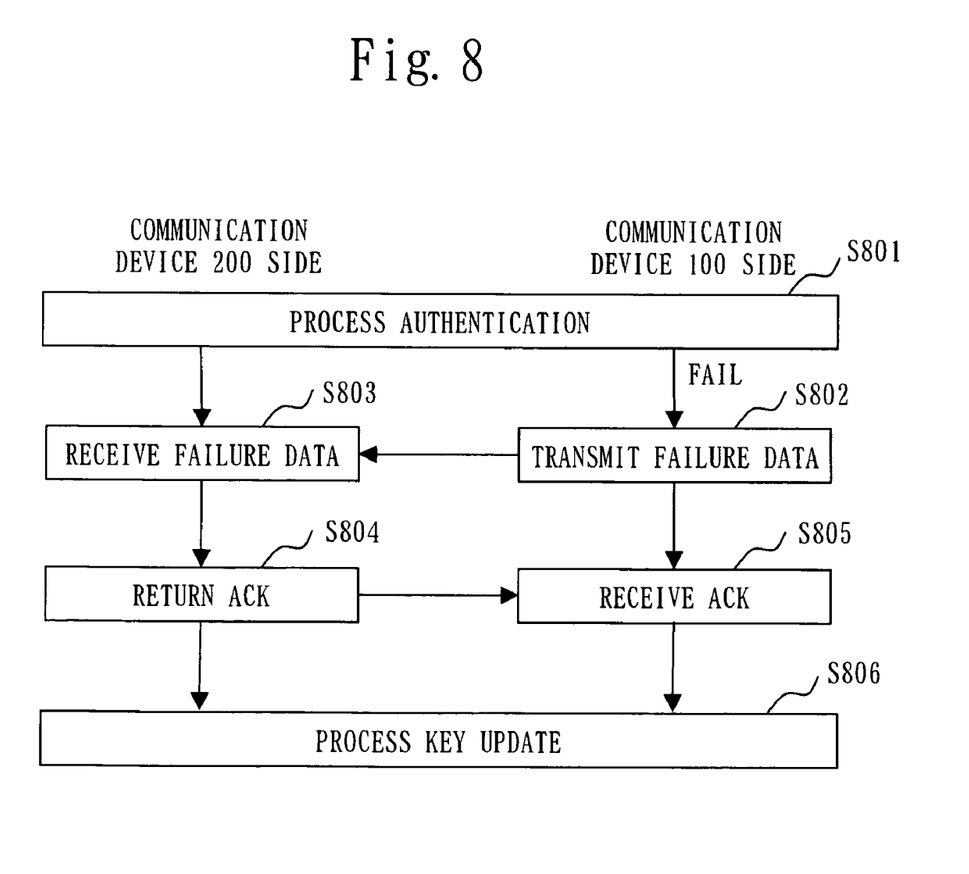
FIG. 8 is a flowchart describing a procedure up to a key update process according to a second embodiment.

FIG. 8 is a flowchart describing a procedure up to a key update process according to the second embodiment.

In S801, the authentication processing unit 197 performs the authentication process with the communication device 200 as the authenticated device. The authentication processing unit 297 in turn performs the authentication process with the communication device 100 as the authenticating device. The authentication key is used in performing the authentication process. When the memory unit 220 stores an authentication key being outdated or having expired, or the memory unit 220 does not store the authentication key, the authentication process in this step ends in failure, since the authentication key is unavailable.

In S802, the transmitting unit 112 transmits failure data indicating that the authentication process has ended in failure to the communication device 200.

In S803, the receiving unit 211 receives the failure data from the communication device 100.

In S804, the transmitting unit 212 transmits (returns) confirmation data (Ack) indicating that the failure data has been received, to the communication device 100.

In S805, the communication device 100 starts the key update process according to the key updating method described in FIG. 3.

In the first embodiment, the authentication processing unit 197 starts the key update process according to the key updating method described in FIG. 3 immediately after the authentication processing unit 197 determines that the authentication process has ended in failure. However, such a configuration is also possible that the authentication processing unit 197 starts the key update process according to the key updating method after it has been confirmed between the communication devices 100 and 200 that the authentication process has ended in failure, as described in FIG. 8.

Figure 9:
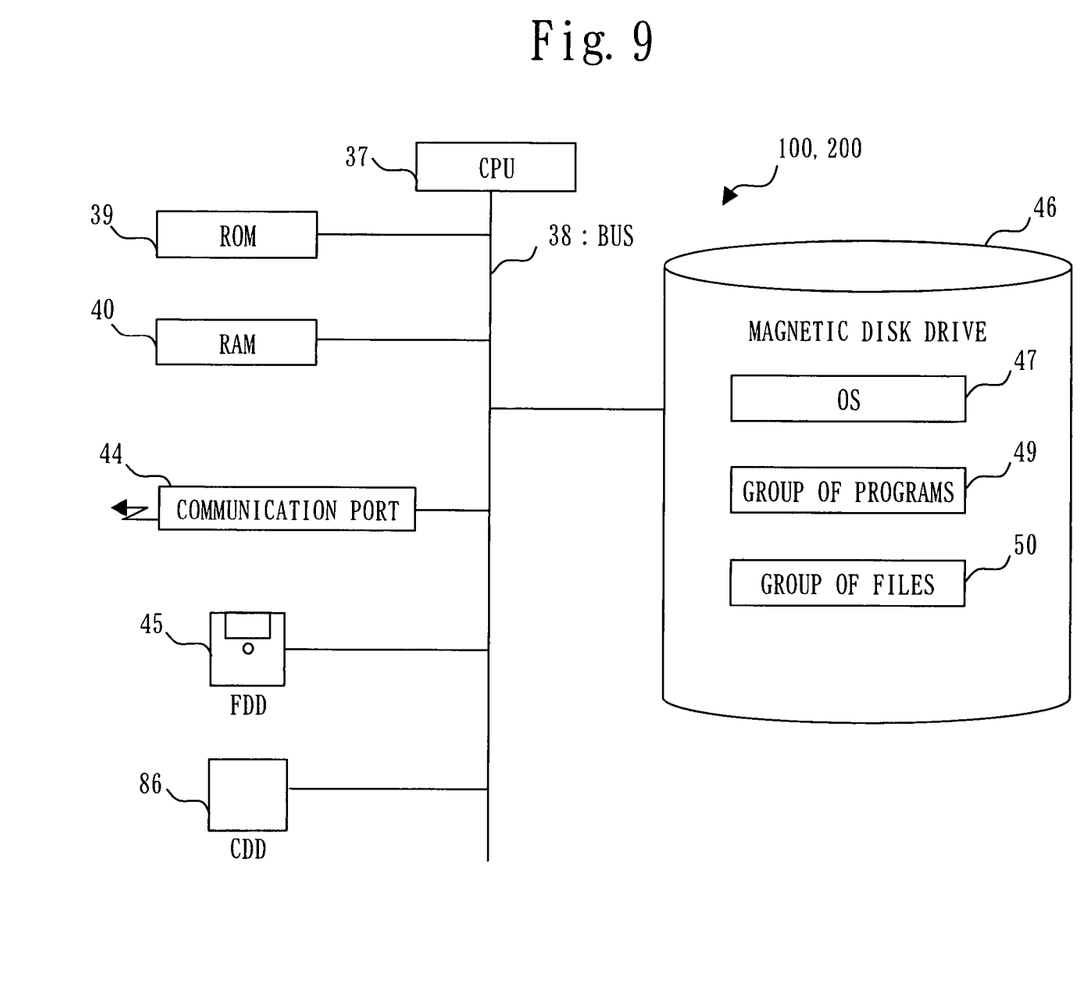
FIG. 9 is a hardware configuration diagram.

FIG. 9 is a hardware configuration diagram.

When programs operable on computers constitute parts or the whole of what are explained in the above explanations for each embodiment as "units", the communication devices 100 and 200 are equipped with CPU 37 (Central Processing Unit 37) to execute programs, as described in FIG. 9. The CPU 37 incorporates, or is connected to via a bus 38, RAM 40 (Random Access Memory 40) as one example of a memory device or a memory unit, and a communication port 44 capable of communicating with the outside. Further, it is also possible to configure the CPU 37 connected to the memory devices such as ROM 39 (Read Only Memory 39) and a magnetic disk drive 46 as described in FIG. 9.

When programs constitute parts or the whole of what are explained in the above explanations for each embodiment as "units", the group of programs 49 in FIG. 9 stores programs executed by what are explained as "units" in the explanations for each embodiment. The group of programs 49 is stored in the memory devices. The group of programs 49 is executed by CPU 37, OS 47 etc. The memory devices store results of each process.

Further, such a configuration is also possible to realize what are explained as "units" in the explanations for each embodiment, by firmware stored in ROM 39. Alternatively, such another configuration is also possible to implement what are explained as "units" in the explanations for each embodiment by software, hardware or combination of software, hardware and firmware.

Further, such another configuration is also possible to store the programs to implement each embodiment by using recording apparatuses with the other recording media, such as a FD (Flexible Disk), an optical disk, a CD (Compact Disk), a MD (Mini Disk) or a DVD (Digital Versatile Disk). In such a case, a FDD 45 (Flexible Disk Drive 45), a compact disk drive 86 (CDD 86) and the like are provided in this configuration as shown in FIG. 9.

INDUSTRIAL APPLICABILITY

The communication device 100 and the communication device 200 as stated above can be used not only as a roadside device at a store side and an on-board device at a vehicle side in ETC, drive-through etc., but also as an authenticating device and as an authenticated device, between mobile communication devices such as mobile telephones, wire communication devices, or a wire communication device and a wireless communication device via a based station and the like.

The present invention makes it possible to execute a key update even in such a case of lack of a key or expiration of a key, to provide a service to an authorized user thereafter, and to enhance the service availability and the user usability of the system using the present invention.

The invention claimed is:

1. An authenticating device comprising:
an authentication processing unit to perform an authentication process with an authenticated device using an authentication key; and
an update key generating unit to generate a new authentication key when the authenticated device does not hold the authentication key to be used in the authentication process by the authentication processing unit, and to generate the new authentication key for updating the authentication key to be used in the authentication process by the authentication processing unit when the authenticated device holds the authentication key but the authentication process with the authenticated device by the authentication processing unit fails,
wherein the authentication processing unit performs the authentication process with the authenticated device again based on a prescribed algorithm identifier and a prescribed encryption key identifier, using the new authentication key generated by the update key generating unit.

2. The authenticating device of claim 1, further comprising a receiving unit to receive the prescribed algorithm identifier and the prescribed encryption key identifier from the authenticated device,
wherein the update key generating unit generates the new authentication key based on the prescribed algorithm identifier and the prescribed encryption key identifier received by the receiving unit,
the authenticating device, further comprising a transmitting unit to transmit the new authentication key generated by the update key generating unit to the authenticated device,
wherein the authentication processing unit performs the authentication process with the authenticated device again, using the new authentication key transmitted by the transmitting unit.

3. An authenticated device comprising:
a memory unit to store a prescribed algorithm identifier and a prescribed encryption key identifier;
an authentication processing unit to perform an authentication process with an authenticating device using an authentication key;
a transmitting unit to transmit the prescribed algorithm identifier and the prescribed encryption key identifier stored by the memory unit, to the authenticating device when the authenticated device holds the authentication key but the authentication process with the authenticating device by the authentication processing unit fails; and
a receiving unit to receive from the authenticating device a new authentication key based on the prescribed algorithm identifier and the prescribed encryption key identifier transmitted by the transmitting unit,
wherein the authentication processing unit performs the authentication process with the authenticating device again, using the new authentication key received by the receiving unit.

4. The authenticated device of claim 3,
wherein the receiving unit receives prescribed information from the authenticating device when the authentication process with the authenticating device by the authentication processing unit fails, and
wherein the transmitting unit transmits the prescribed algorithm identifier and the prescribed encryption key identifier stored by the memory unit, when the prescribed information has been received by the receiving unit.

5. A key updating method comprising:
transmitting prescribed information from an authenticating device to an authenticated device when an authentication process fails, the authentication process being performed between the authenticated device which stores a prescribed algorithm identifier and a prescribed encryption key identifier, and the authenticating device, using an authentication key;
receiving the prescribed information transmitted from the authenticating device, at the authenticated device;
transmitting from the authenticated device to the authenticating device, the prescribed algorithm identifier and the prescribed encryption key identifier stored, after the prescribed information is received;
receiving the prescribed algorithm identifier and the prescribed encryption key identifier transmitted at the authenticating device;
generating a new authentication key, based on the prescribed algorithm identifier and the prescribed encryption key identifier received, at the authenticating device;
transmitting the new authentication key generated to the authenticated device;
receiving the new authentication key transmitted at the authenticated device;
executing a key update using the new authentication key received, as an update key to perform the authentication process between the authenticated device and the authenticating device;
generating and transmitting an update confirmation data to the authenticating device; and
receiving and checking the update confirmation data.

6. A computer readable storage medium having stored thereon computer executable program for performing an authentication process, the computer program when executed causes a processor to execute steps of:
transmitting prescribed information from an authenticating device to an authenticated device when an authentication process fails, the authentication process being performed between the authenticated device which stores a prescribed algorithm identifier and a prescribed encryption key identifier, and the authenticating device, using an authentication key;

receiving the prescribed information transmitted from the authenticating device, at the authenticated device;

transmitting from the authenticated device to the authenticating device, the prescribed algorithm identifier and the prescribed encryption key identifier stored, after the prescribed information is received;

receiving the prescribed algorithm identifier and the prescribed encryption key identifier transmitted at the authenticating device;

generating a new authentication key, based on the prescribed algorithm identifier and the prescribed encryption key identifier received, at the authenticating device;

transmitting the new authentication key generated to the authenticated device;

receiving the new authentication key transmitted at the authenticated device;

executing a key update using the new authentication key received, as an update key to perform the authentication process between the authenticated device and the authenticating device;

generating and transmitting an update confirmation data to the authenticating device; and receiving and checking the update confirmation data.

* * * * *